US010248507B1

(12) United States Patent
Batishchev

(10) Patent No.: US 10,248,507 B1
(45) Date of Patent: Apr. 2, 2019

(54) VALIDATION OF CONDITION-SENSITIVE MESSAGES IN DISTRIBUTED ASYNCHRONOUS WORKFLOWS

(71) Applicant: Amazon Technologies, Inc., Seattle, WA (US)

(72) Inventor: Andriy Batishchev, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 15/633,246

(22) Filed: Jun. 26, 2017

(51) Int. Cl.
| | |
|---|---|
| *G06F 15/167* | (2006.01) |
| *G06F 11/14* | (2006.01) |
| *H04L 29/08* | (2006.01) |
| *G06Q 40/04* | (2012.01) |
| *G06Q 30/08* | (2012.01) |

(52) U.S. Cl.
CPC ......... *G06F 11/1402* (2013.01); *G06Q 30/08* (2013.01); *G06Q 40/04* (2013.01); *H04L 29/08009* (2013.01)

(58) Field of Classification Search
CPC .... G06F 11/1402; G06Q 30/08; G06Q 40/04; H04L 29/08009; H04L 51/00; H04L 51/14
See application file for complete search history.

(56) References Cited

U.S. PATENT DOCUMENTS

| | | | | |
|---|---|---|---|---|
| 8,862,673 B2* | 10/2014 | Shkolnikov | ........... | H04L 51/063 709/206 |
| 9,741,043 B2* | 8/2017 | Vratskides | ............. | G06Q 30/02 |
| 2010/0093313 A1* | 4/2010 | Keihag | ............ | H04M 3/42017 455/412.1 |
| 2013/0097270 A1* | 4/2013 | Plotkin | ............. | H04M 1/72547 709/206 |
| 2015/0381532 A1* | 12/2015 | Bhatia | ..................... | H04L 51/02 709/206 |
| 2016/0119274 A1* | 4/2016 | Ghafourifar | ............ | H04L 51/36 709/206 |
| 2018/0129645 A1* | 5/2018 | Grant | .................... | G06F 17/279 |

* cited by examiner

*Primary Examiner* — Jonathan A Bui
(74) *Attorney, Agent, or Firm* — Lee & Hayes, P.C.

(57) ABSTRACT

Technologies are disclosed for validation of condition-sensitive messages (or other electronic files) in distributed asynchronous message workflows. An asynchronous message processing system includes a message producer configured to generate an original message that includes at least one attribute related to a time of arrival of the original message at a message publishing service. A validation service is also included that initially validates a current time and generates alternatives for the original message. The alternatives for the original message are based upon a plurality of potential times of arrival. A gatekeeper service selects one of (i) the original message or (ii) one of the alternatives for the original message based upon a time of arrival. The selected message or alternative for the original message is provided to the message publishing service to publish the selected one of the original message or the selected alternative for the original message to an entity.

20 Claims, 6 Drawing Sheets

VALIDATION OF CONDITION-SENSITIVE MESSAGES IN DISTRIBUTED ASYNCHRONOUS WORKFLOWS

BACKGROUND

Electronic files, such as, for example, messages, data packets, etc., are generally created by a user and then sent electronically to an endpoint. For example, the user may create a message that is produced by a message production service of a message processing system. The message is sent along a workflow of the message processing system to a message publishing service of the message processing system that publishes the message. The publishing service may provide the message to a database for storage, may provide the message to another entity that may change state based upon the message or some perform some other function, may provide the message to another user, etc.

Often, such messages may have attributes or conditions that need to be satisfied for the message to be valid. For example, a message may only be relevant or valid if it arrives at a particular time or on a particular day. Thus, while the message may be generated and sent early enough to arrive by the appropriate time or day, due to various issues such as, for example, workload of the message processing system over which the message is being sent, available bandwidth, size of the message and any attachments, error rate, etc., the message may not arrive by the desired time or day. Thus, it is difficult and costly to predict how long it may take for a message to travel along the workflow from a starting point to an end point.

In order to alleviate delays in receipt of messages, it is common practice to validate a message as early as possible along the workflow of the transmitted message, e.g., the workflow of moving the message from a starting point to an endpoint. This validation process verifies that attributes of the message are correct and do not violate preset rules. However, as previously noted, by the time the message reaches the endpoint, the message may no longer be valid due to one or more attributes not meeting predetermined criteria, e.g., the message arrives late. Thus, a second validation process is often included in the workflow at or just prior to the endpoint of the workflow. This second validation process verifies that the message is valid and does indeed satisfy the predetermined criteria. If the message satisfies the predetermined criteria, then the message is passed along to the message publishing service at the endpoint.

However, if the message does not satisfy the predetermined criteria, then the message is ignored and/or discarded and an error message may be sent to the starting point, e.g., the message production service, and/or to the user that sent the message. Rejected messages incur additional computing resource costs, such as processing delays, troubleshooting and message republishing. Generally, the cost of failure is proportional to the computation resources dedicated to the message prior to the rejection of the message. Furthermore, the inclusion of two duplicative validation processes increases operation costs. Additionally, it currently is too expensive or even impossible to change messages at the endpoint of the workflow, e.g., just prior to the message publishing service. Changing of messages just prior to the message publishing service requires extra business logic to perform the validation and changing of the messages. More particularly, validation just prior to the message publishing service may be costlier, or even impossible, for example, due to the computational cost of making calls to other services, the cost of accessing business logic or security restrictions in the message publishing environment. Furthermore, some devices at the endpoint of the workflow may be "dumb" devices incapable of validating and/or changing messages, as well as only being capable of unidirectional communications, e.g., receiving communications.

The disclosure made herein is presented with respect to these and other considerations.

DETAILED DESCRIPTION

Figure 1:
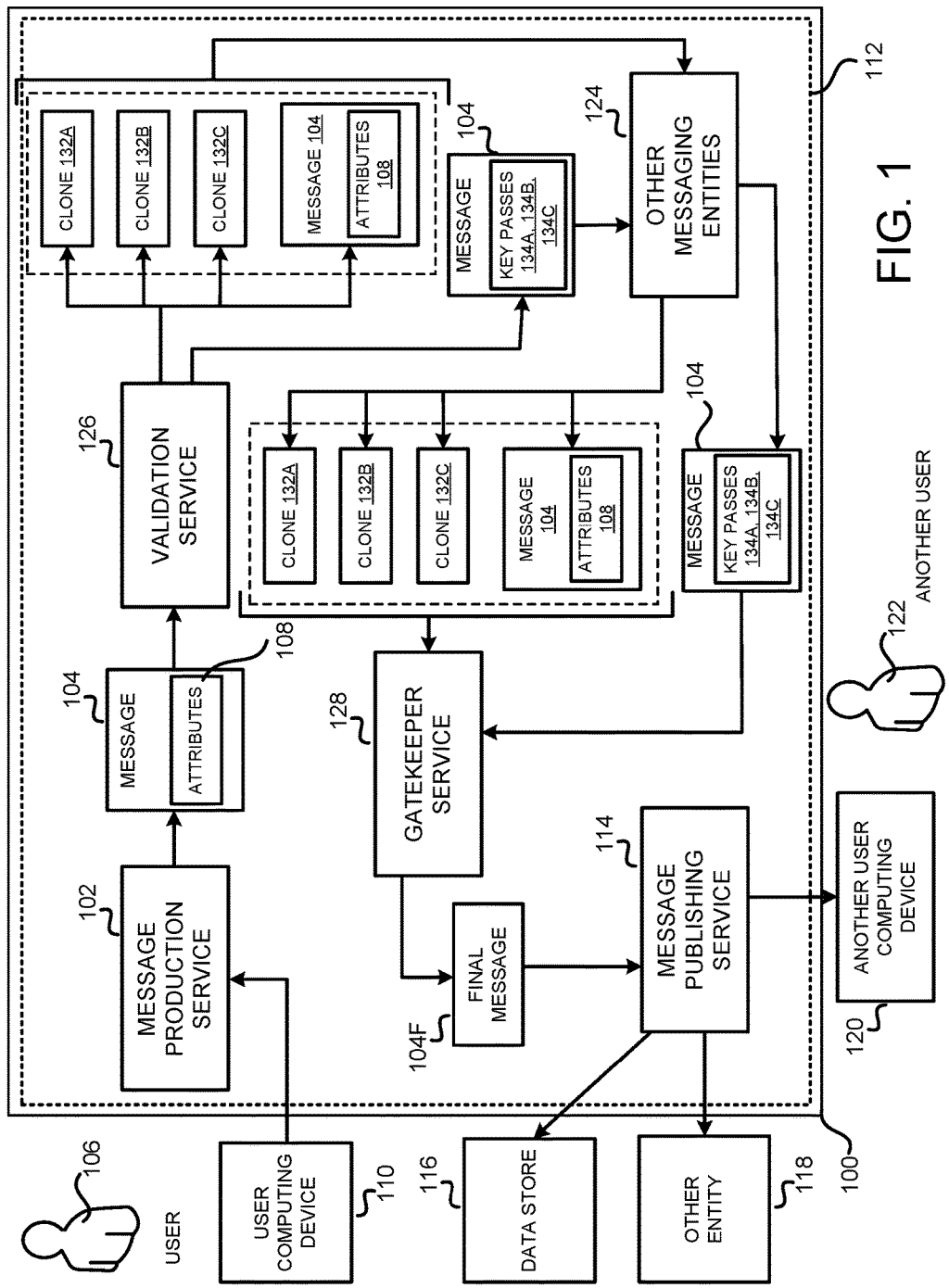
FIG. 1 is a software and network architecture diagram illustrating aspects of the configuration and utilization of an asynchronous message processing system that includes validation of condition-sensitive messages, according to one particular configuration.

The following detailed description is directed to technologies for validation of condition-sensitive messages (or other electronic files) in distributed asynchronous message workflows within a message processing system. Condition-sensitive electronic files, e.g., messages with time sensitive attributes, may be managed to allow for timely reception at an endpoint of the workflow. For example, clones of messages may be created and sent with the original message to the endpoint. Alternately, key passes may be included with the original messages and sent to the endpoint of the workflow.

The clones and key passes provide alternatives to the messages that are only valid based upon a time of receipt. Only the valid original message, a valid clone message or a valid key pass is passed to a message publishing service at the endpoint of the workflow, while any invalid clones and key passes are discarded. Such techniques allow for significant savings in CPU time, network bandwidth, power, as well as other types of computing resources.

Furthermore, only a single validator is required at the beginning of the workflow and thus, validation is simpler. A simple gatekeeper is all that is required near the endpoint of the workflow to determine which of the original message, clone message or key pass is valid upon arrival. Technical benefits other than those specifically identified herein might be realized through an implementation of the technologies disclosed herein.

In particular, a message may be generated by a message production service of an asynchronous distributed message processing system. The message may be automatically generated by the message production service or may be generated at the behest of a user using a computing device that communicates with the message production service.

Once the message has been created, the message may be sent along a workflow of the message processing system to an endpoint, e.g., a message publishing service of the message processing system. The message publishing system may then publish the message by providing the message to a data store for storage, providing the message to another entity or machine that may, based upon the message, change state or perform some other function, such as providing the message to another user. In configurations, the message publishing service may, based upon the message, change state itself. While the present disclosure is presented herein with respect to messages, it should be noted that the techniques described herein may be applicable to the transmission of other electronic files, e.g., network packets.

In configurations, a validator may be provided along the workflow. The workflow may include multiple possible routes upon which a message may travel to reach the message publishing service. The validator may serve as a consultant and/or a multiplexor.

Once a message has been generated and sent by the message production service on to the workflow, the validator may validate the message based upon attributes of the message, e.g., that the message is not already late. The validator may act as a consultant and propose various alternative routes, scenarios, new and/or additional message attributes, etc., which may help ensure that the message will arrive at a message publishing service at a desired time. Based upon the suggestions of the validator, the user may decide to alter a route for the message to follow within the workflow, message attributes, etc.

In configurations, the validator may also serve, either in addition to or instead of the consultant role, as a multiplexer. In such configurations, the validator may "multiply" the message by cloning the message to produce one or more clones of the message. The one or more clones may include differing content based upon an anticipated arrival time at the message publishing service. For example, the original message may have a desired arrival time at the message publishing service of 12:00 p.m. However, if the original message arrives at the message publishing service at 1:00 p.m., then the content of the message may need to be different. Accordingly, the validator may create a clone of the message with appropriate content in the message that is based upon the time of arrival at the publishing service. The original message and the clone are then encrypted and sent along on the workflow.

In configurations, the validator may create one or more key passes to be included with the original message instead of cloning the messages. Once again, if the desired time of arrival for the message at the publishing service is 12:00 p.m., a key pass may be created that includes a configuration file to alter the content of the original message for the situation where the message arrives at 1:00 p.m. The validator encrypts the message and key passes and sends the message with any key passes along the workflow.

In configurations, a gatekeeper along the workflow just prior to the message publishing service is provided that verifies the validity of messages. The gatekeeper decrypts received messages and determines, depending upon the time of arrival of the original message and the clone messages, if a received message is valid. For example, if the original message arrives by 12:00, then the original message is provided to the message publishing service. Subsequent arriving clone messages are ignored by the gatekeeper and discarded. If the original message arrives by 1:00, it is deemed invalid and discarded. If a clone message configured for arrival by 1:00 arrives by 1:00, then the clone message is deemed valid and provided to the message publishing service. Subsequent arriving clone messages (as well as the original message) are ignored by the gatekeeper and discarded. If, by chance, the original message and clone message all arrive too late for any of them to be valid, then an error may be generated and sent to a system controller and/or a user that generated the message.

In the situation where the validator creates key passes, depending upon the time of arrival of the message and the key passes, the gatekeeper selects the appropriate key pass and the other key passes are discarded. For example, if the message arrives by 12:00, then all key passes are discarded. If the message arrives by 1:00, then the key pass for 1:00 is selected as valid and any other key passes are discarded. The message is modified according to the key pass and provided to the message publishing service. If, by chance, the message and key passes arrive too late for any of the key passes to be valid, then an error may be generated and sent to a system controller and/or a user that generated the message. Additional details regarding the various components and processes described briefly above for validation of condition-sensitive messages in distributed asynchronous message workflows will be presented below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 schematically illustrates a distributed asynchronous message processing system 100 (referred to herein as message processing system 100). In configurations, the asynchronous distributed message processing system may provide an asynchronous messaging protocol ("AMP") messaging infrastructure. In configurations, the message processing system 100 may be a system that is an internal system, i.e., is part of an internal network within an organization or entity. Alternately, the message processing system 100 may be implemented via one or more organizations or entities and thus portions of the message processing system 100 may be communicatively coupled together via some type of electronic communication system, e.g., the Internet. In configurations, all or part of the message processing system 100 is implemented in a service provider network that may provide other computing resources.

The message processing system 100 may include a message production service 102 that produces messages 104. The message production service 102 may be implemented via one or more servers, other computing devices, software, and/or firmware. The messages 104 may be produced automatically in response to some entity (not illustrated) or may be generated at the behest of a user 106. The user 106 may create content of a message 104 and define attributes or parameters 108 for the message 104 using a computing device 110. The computing device 110 may then provide the content and any associated attributes 108 to the message production service 102. The computing device 110 can be any type of computing device capable of connecting to the message processing system 100 via a suitable data communications network such as, but not limited to, a laptop or desktop computer, a tablet computing device, a server computer, a smartphone, etc.

Once the message production service 102 produces the message 104, the message production service 102 sends the message 104 along a workflow 112 (i.e., a series of ordered processing steps for providing messaging functionality) within the message processing system 100. The message 104 may be sent along the workflow 112 to a message publishing service 114 that may publish or consume the message 104. The message publishing service 114 may be implemented via one or more servers, other computing devices, software, and/or firmware. The message publishing service 114 may provide the message 104 to a data store 116 for storage or another entity or machine 118 for consumption. Consumption of the message 104 may cause the entity 118 to change state or perform some other action. In configurations, the message publishing service 114 may provide the message 104 to another computing device 120 of another user 122, e.g., the message 104 may be an email message. The workflow 112 may include one or more other messaging entities 124 such as, for example, one or more queues.

In configurations, a validation service 126 and a gatekeeper service 128 are included along the workflow 112. The validation service 126 is generally included just after the message production service 102 along the workflow 112. In configurations, the validation service 126 may be a part of the message production service 102. The gatekeeper service 128 is generally located just prior the message publishing service 114 along the workflow 112. In configurations, the gatekeeper service 128 may be part of the message publishing service 114.

The validation service 126 and the gatekeeper service may be implemented via various servers, computing devices, software, and/or firmware. As previously noted, all or part of the message processing system 100 may be implemented in a service provider network that may provide other computing resources. Additional details regarding the configuration and operation of such a service provider network will be provided below with regard to FIGS. 4-6.

In configurations, upon creation of a message 104, the validation service 126 initially validates messages 104 based upon one or more attributes 108 of the messages related to conditions of delivery of messages 104. For example, if a message 104 needs to be received by the message publishing service 114 by a certain time, the validation service ensures that the message 104 is not already late. Thus, such an attribute 108 is related to a condition of delivery. Other attributes 108 or conditions may also be validated by the validation service 128 depending upon the message 104. For example, the message may only be relevant or applicable based upon the state or status of an entity or organization (e.g., a business, a location, a group, a stock exchange, a commodity exchange, etc.), a price, a purchase order, (e.g., a purchase order for a stock exchange or for a commodity exchange), weather conditions (e.g., rain, snow, sun, clouds, temperature, atmospheric conditions, etc.), etc.

Thus, based upon the message attributes 108, the validation service 126 validates that the message 104 is indeed valid at this point. If the message 104 is valid then the validation service 126 may analyze conditions along the workflow 112, e.g., serve as a "consultant." For example, there may be multiple paths within the workflow 112 for the message 104 to travel in order to arrive at the message publishing service 114. For example, as previously noted, there may be other messaging entities 124 along the workflow 112 and along various paths. Such messaging entities 124 may include queues and thus, depending upon the bandwidth of the path and a backlog of a various devices implementing the message publishing service 114 and the gatekeeper service 128, certain paths within the workflow 114 may be more desirable than others. Thus, the validation service 126 may select a particular path or may recommend to a user 106 that a particular path be chosen for the message 104.

Based upon a message attribute 108, the message 104 may be time sensitive. In configurations, the validation service 126 may determine that the message 104 may arrive at the message publishing service 114 late. For example, one of the message attributes 108 may indicate that the message 104 should preferably arrive by a first time but that the message can arrive at other times up to a predetermined threshold. For example, the message may be a birthday message from the user 106 to another user 122. If the birthday is June 5, then one of the attributes 108 may be for the content of the original message 104 to say "Happy Birthday! Hope you have a great day!" Thus, for the original message 104, the message 104 needs to arrive on June 5 to be valid and accurate.

Accordingly, in configurations, the validation service 126 may create alternatives for the message 104 based upon potential arrival times for the message 104. In a configuration, the validation service 126 may create clones 132 of the original message 104 that include varying content. An attribute 108 of the original message 104 may indicate that the message 104 needs to arrive no later than three days after June 5, e.g., June 8. Thus, the validation service 126 can create three clones 132A, 132B, 132C: one for June 6, one for June 7 and one for June 8. The clone message 132A may be for June 6 and read "Happy Birthday! Sorry I'm a day late; hope you had a great day." The clone message 132B may be for June 7 and may read "Happy Birthday! Sorry I'm a couple days late; hope you had a great day." Finally, the clone message 132C may be for June 8 and may read "Happy Birthday! Sorry this is so late; hope you had a great day." The validation service 126 may then encrypt the original message 104 and the clone messages 132 and send the messages 104, 132 along the workflow 112.

As messages 104, 132 arrive at the gatekeeper service 128, the gatekeeper service 128 decrypts the message 104, 132 to ensure their validity. The gatekeeper service 128 then determines if the arriving message has arrived in time (as well as any other conditions that may need to be satisfied). For example, if the original message 104 arrives by June 5, then the original message 104 is forwarded to the message publishing service 114. As the clone messages 132 arrive, they are ignored or discarded by the gatekeeper service 128. However, if the original message 104 arrives on June 6, then the original message 104 is ignored or discarded. If the June 6 clone message 132A then arrives on June 6, the clone message 132A is forwarded to the message publishing service 114 and the clone messages 132B, 132C are ignored when they arrive. If the June 7 clone message 132B arrives on June 7 (and the original message 104 and clone message 132A did not arrive on time), then the clone message 132B is forwarded to the message publishing service 114 and the original message 104 and clone messages 132A, 132C are ignored when they arrive. If the June 8 clone message 132C arrives on June 8 (and the original message 104 and clone messages 132A, 132B did not arrive on time), then the clone message 132C is forwarded to the message publishing service 114 and the original message 104 and clone messages 132A, 132B are ignored when they arrive.

For example, after a first successful message 104, 132 arrives at the gatekeeper service 128, subsequent messages need to be discarded or ignored. In configurations, the messages 104, 132 may be tracked or the state of the message processing system 100 may be tracked. Alternately, all of the messages 104, 132 may be allowed to pass through and reach the end point of the workflow 112, e.g., the message publishing service 114. The end point is idempotent. Duplicate messages 104, 112 are unable to change the state of the end point, e.g., the message publishing service 114.

In configurations, the messages 104, 132 may include a tracking marker. For example, each message 104, 132 may include a tracking marker indicating "message 1 out of 10," "message 2 out of 10," etc. In configurations, the last message may explicitly indicate the status of the series "message 10 out of 10. Last message." If all of the messages 104, 132 arrive too late, then an error message is generated and forwarded to the message production service 102 or the user 106 that created the message.

In a configuration, the validation service 126 may create key passes 134 that include varying content similar to the clone messages 132 as alternatives for a message 104. The key passes 132 may include or be in the form of configuration files that may alter the original message 104 so that the original message 104 would include the various content described above for the clone messages 132. In some embodiments, a key pass 132 may be a file, which includes a valid configuration and/or time frame when a scenario corresponding to the key pass is valid. For example, the validation service 126 can create three key passes 134A, 134B, 134C: one for June 6, one for June 7 and one for June 8. The key pass 134A may be for June 6 and may provide content that configures the message 104 to read "Happy Birthday! Sorry I'm a day late; hope you had a great day." The key pass 134B may be for June 7 and may provide content that configures the message 104 to read "Happy Birthday! Sorry I'm a couple days late; hope you had a great day." Finally, the key pass 134C may be for June 8 and may provide content that configures the message 104 to read "Happy Birthday! Sorry this is so late; hope you had a great day."

Once the key passes 132 are created, the key passes 134 are attached to the original message 104 and encrypted by the validation service 126. The original message 104 with the key passes 134 is then sent by the validation service 126 over the workflow 112. Thus, in the configurations where the validation service 126 creates clone messages 132 or key passes 134, the validation service 126 is functioning as a multiplexor, e.g., the validation service 126 is creating multiple message configurations. In configurations, the validation service 126 is configured to operate as both a consultant and a multiplexer.

Once the message 104 with the key passes 134 reaches the gatekeeper service 128, the gatekeeper service 128 decrypts the message 104 and key passes 134 to ensure their validity. The gatekeeper service 128 also analyzes the attributes of the message 104 and key passes 134 and determines if any of the original message 134 or key passes is valid with respect to any conditions required for delivery of the message 104. Thus, for the birthday message example, the gatekeeper service 128 determines if the message 104 and key passes 134 has arrived on either June 5, 6, 7 or 8. Depending upon the date, the appropriate message may be forwarded to the message publishing service 114. For example, if it is June 5, then the original message 104 is forwarded to the message publishing service 114 and the key passes 134 are discarded. If it is June 6, then the key pass 134A directed to June 6 is valid and the original message 104 may be modified by the gatekeeper service 128 in accordance with the June 6 key pass 134A and the message 104 is then forwarded to the message publishing service 114. The June 7 and 8 key passes 134B and 134C are then discarded. If it is June 7 or June 8, then the appropriate key pass 134B or 134C is used to modify the original message 104 and the other key passes are discarded. If it is June 9 or later, then the original message 104 and key passes 134 are discarded and an error may be sent to the user 106 that generated the original message or to message production service 102 within the message processing system 100.

Once the gatekeeper service 128 has selected a valid and appropriate message 104, 132, or message modified by a valid and appropriate key pass 134, the gatekeeper service 128 provides a final message 104F that is forwarded to the message publishing service 114. The final message 104F may include one or more attributes 108 of the original message 104, or none of the attributes 108 of the original message 108. The message publishing service 114 may then publish the message 104F by forwarding it to the appropriate entity. For example, if the original message 104 was meant to be stored in the data store 116, then the message publishing service 114 may forward the final message 104F to the data store 116 for storage. Alternately, the original message 104 may have been intended for another entity 118 and thus the final message 104F may be forwarded to the another entity 118. The message 104F may cause the entity 118 to change state or to perform some other function. Additionally, the original message 104 may have been intended for another user 122 and thus the final message 104F may be forwarded to the user 122.

The validation service 128 can be aware of encryption keys that may be used for encrypting messages 104, 132, and key passes 134 for verification by the gatekeeper service 128. This may be achieved by a unidirectional channel between the validation service 126 and the gatekeeper service 128. It may also be achieved by the validation service 126 being aware that the gatekeeper service 128 periodically changes encryption keys, e.g., once a day at midnight. Finally, the gatekeeper service 126 may be implemented via a device or a function wherein the gatekeeper service 126 is periodically replaced and the new encryption keys for use by the gatekeeper service 126 are made known to the validation service 128. Thus, it can be understood that the validation service 126 serves as a crypto key generator, while the gatekeeper service 128 serves a crypto key reader in some configurations.

In configurations, message attributes 108 may defines a condition for arrival of a message 104. For example, the condition may be if a message 104 arrives by X or sooner, then the message 104 is valid. Likewise, the condition may indicate that as long as message 104 arrives by X or later, then the message 104 is valid. Thus, in configurations, the validation service 126 may slow down messages 104 so that they arrive by X or later if the validation service 126 predicts and/or determines that a message 104 is likely to arrive prior to X.

While the present disclosure has been described herein primarily with respect to messages, it is to be noted that any data type (e.g., network packets, SNS messages, electronic files, etc.) may be transmitted utilizing similar techniques. For example, data packets may be generated and forwarded along a workflow utilizing similar techniques. Thus, the message processing system 100 may be implemented as an electronic file workflow, and the message production service 102 and the message publishing service 114 may comprise an electronic file production service and an electronic file service, respectively.

Furthermore, the messages may be utilized, as previously noted, to change state of an entity. For example, the data store 116 may be set up to primarily handle reads throughout most of the day. However, the data store 116 does need to be made available for writes periodically. Thus, messages 104 with either clones 132 or key passes 134, may be generated and sent to the data store 116 along the workflow 112 within the message processing system 100. Based upon attributes 108 within the messages and/or key passes, along with potential attributes of the data store 116, a message 104, 132 or key pass 134 may be accepted for allowing the data store 116 to change state and accept writes.

As another example, one of the other entities 118 may be an intelligent Internet of Thing ("TOT") device. For example, a user's home may include lights that are controlled by an TOT controller. If a user wants to turn the lights on at the home, then it may be desirable to know if the lights are already on. Thus, the TOT controller may utilize a gatekeeper similar to the gatekeeper system 128 described herein to allow an "ON" signal or a message instructing the TOT controller to change state to the "ON" state to only pass to the TOT controller at night and when the TOT controller is in an "OFF" state. If all messages are wrong or late, e.g., arrive and do not satisfy the condition(s), then the TOT controller may take a default action, e.g., turn off the lights since generally the TOT controller is only capable of unidirectional communications, e.g., can only receive communications.

Figure 2:
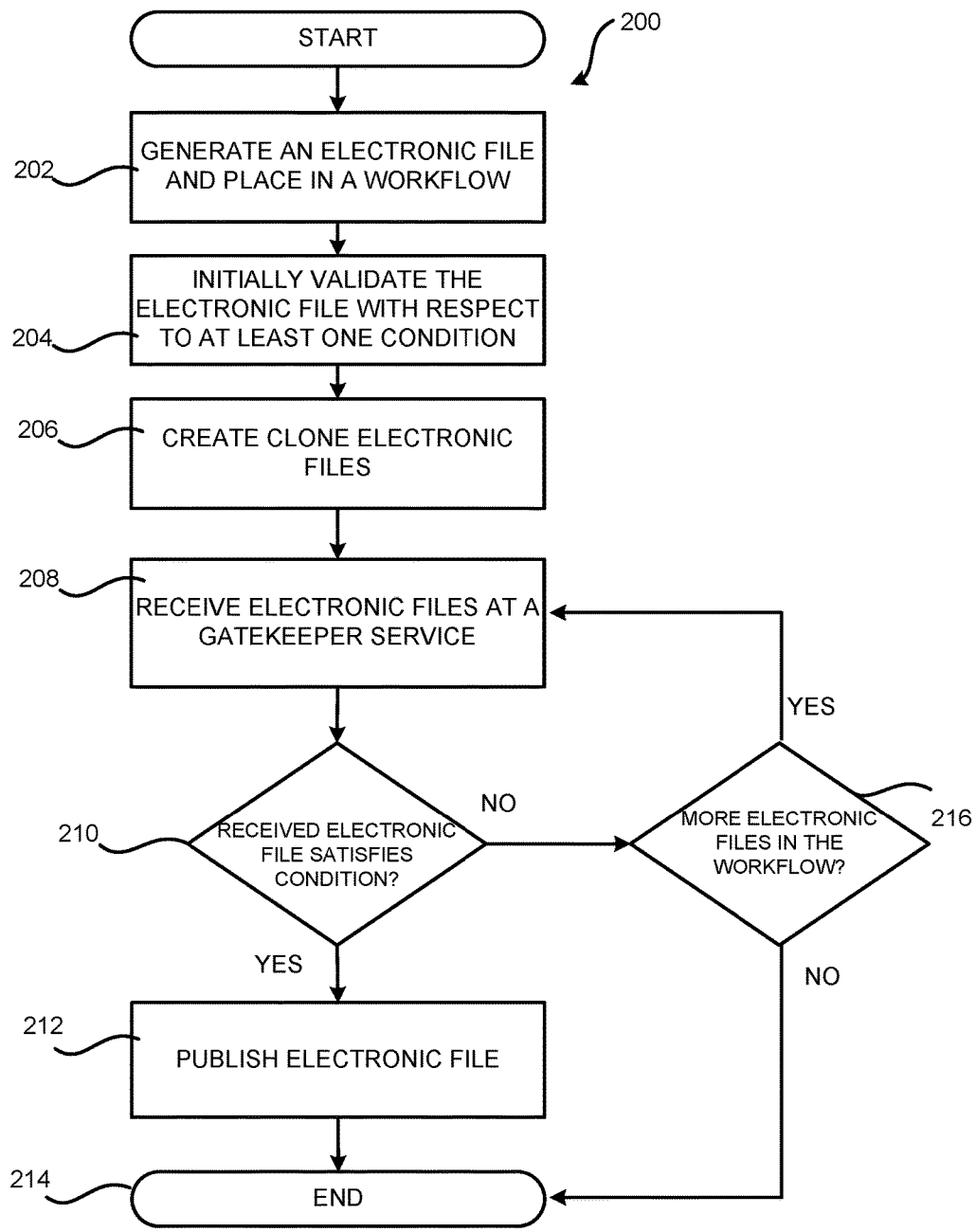
FIG. 2 is a flow diagram illustrating a routine that illustrates aspects of validating condition-sensitive electronic files in an electronic file workflow utilizing clone electronic files, according to one particular configuration.
Figure 3:
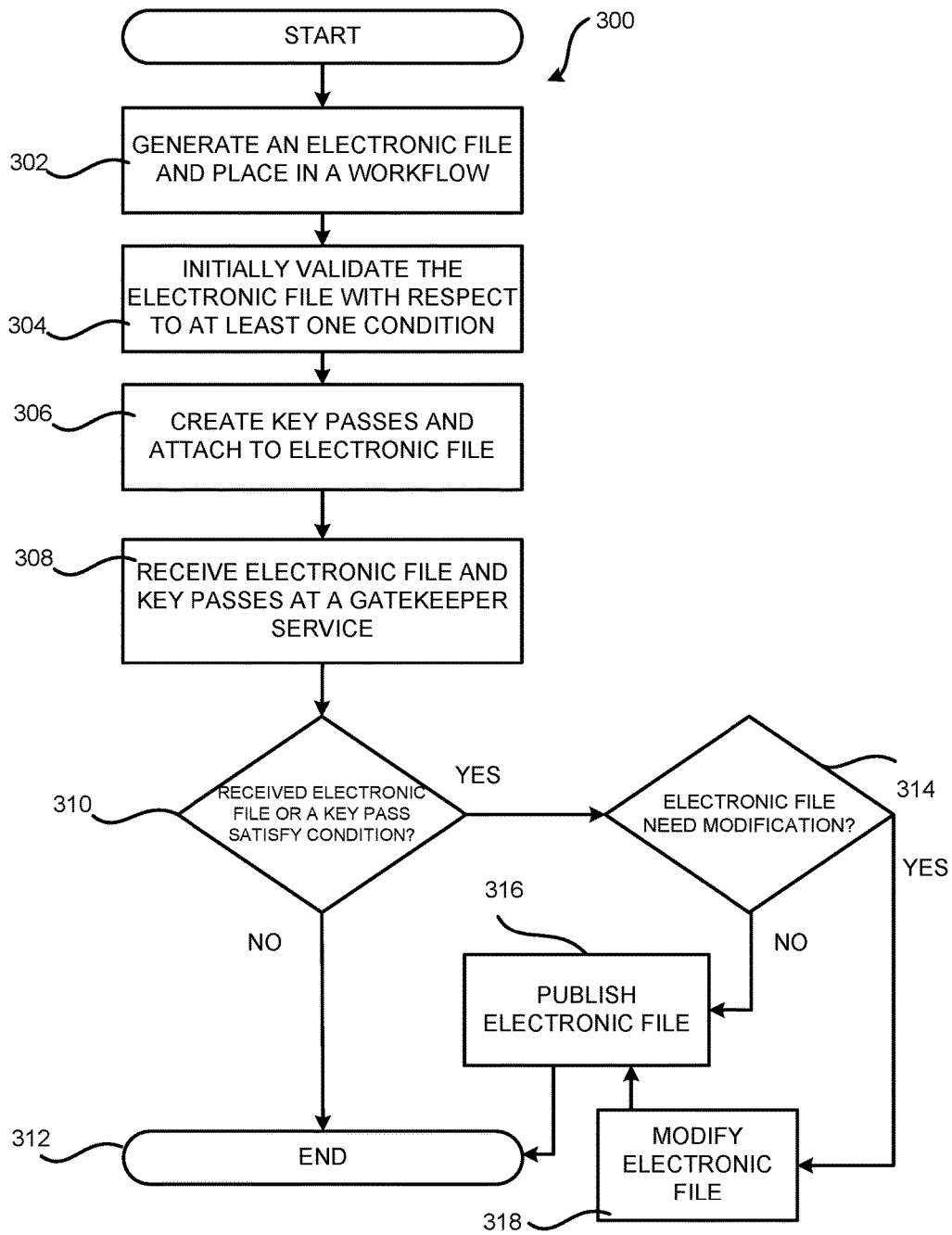
FIG. 3 is a flow diagram illustrating a routine that illustrates aspects of validating condition-sensitive electronic files in an electronic file workflow utilizing key passes attached to the electronic files, according to one particular configuration.

FIGS. 2 and 3 are flow diagrams illustrating routines 200 and 300 that illustrate aspects of validation of condition-sensitive electronic files in an electronic file workflow, e.g., messages 104 in distributed asynchronous message workflows, e.g., message processing system 100, illustrated in FIG. 1. It should be appreciated that the logical operations described herein with respect to FIGS. 2 and 3, and the other FIGs., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than illustrated in the FIGS. and described herein. These operations can also be performed in parallel, or in a different order than those described herein. Some or all of these operations can also be performed by components other than those specifically identified.

Referring to FIG. 2, the routine 200 begins at operation 202, where an electronic file, e.g., message 104, is generated and placed in a workflow, e.g., the workflow 112 of message processing system 100. In configurations, the electronic file is generated by an electronic file production service, e.g., message production service 102.

At operation 204, the electronic file is initially validated by a validation service based upon at least one condition related to at least one attribute of the electronic file, e.g., attributes 108. For example, the validation service 126 initially validates the electronic file to ensure that the electronic file still satisfies the at least one condition.

From operation 204, the operation 200 proceeds to operation 206, where the validation service creates clone electronic files, e.g., clone messages 132. The clone electronic files provide varying content with respect to the original electronic file based upon various anticipated times of arrival of the electronic file and the clone electronic files at an electronic file publishing service, e.g., the message publishing service 114 At operation 208, electronic files are received at a gatekeeper service, e.g., the gatekeeper service 128.

At operation 210, it is determined, by the gatekeeper service if a received electronic file satisfies the at least one condition. If yes, the routine 200 proceeds to operation 212 where the electronic file is published by the electronic file publishing service. From operation 212, the routine 200 proceeds to operation 214, where it ends. If no, then the operation 200 proceeds to operation 216 where it is determined if any more electronic files (either the original electronic file or any clone electronic files related to the original electronic file) are in the workflow. If yes, the routine 200 returns to operation 208. If no, the routine 200 proceeds to operation 214, where it ends.

Referring to FIG. 3, the routine 300 begins at operation 302, where an electronic file, e.g., message 104, is generated and placed in a workflow, e.g., the workflow 112 of message processing system 100. In configurations, the electronic file is generated by an electronic file production service, e.g., message production service 102.

At operation 304, the electronic file is initially validated by a validation service based upon at least one condition related to at least one attribute of the electronic file, e.g., attributes 108. For example, the validation service 126 initially validates the electronic file to ensure that the electronic file still satisfies the at least one condition.

From operation 304, the operation 300 proceeds to operation 306, where the validation service creates key passes, e.g., key passes 134, and attaches the key passes to the electronic file. The key passes provide varying content for the electronic file based upon various anticipated times of arrival of the electronic file at an electronic file publishing service, e.g., the message publishing service 114. At operation 308, the electronic file and key passes are received at a gatekeeper service, e.g., the gatekeeper service 128.

At operation 310, it is determined, by the gatekeeper service if the received electronic file or any of the key passes satisfies the at least one condition. If no, the routine 300 proceeds to operation 312, where it ends. If yes, the routine 300 proceeds to operation 314, where it is determined if the electronic file needs to be modified by a valid key pass. If no, the routine 300 proceeds to operation 316, where the electronic file is published by the electronic file publishing service. From operation 316, the routine 300 proceeds to operation 312, where it ends. If yes, the routine 300 proceeds to operation 318 where the electronic file is modified based upon the valid key pass. From operation 318, the routine 300 proceeds to operation 316, where the modified electronic file is published by the electronic file publishing service. From operation 316, the routine 300 proceeds to operation 312, where it ends.

Figure 4:
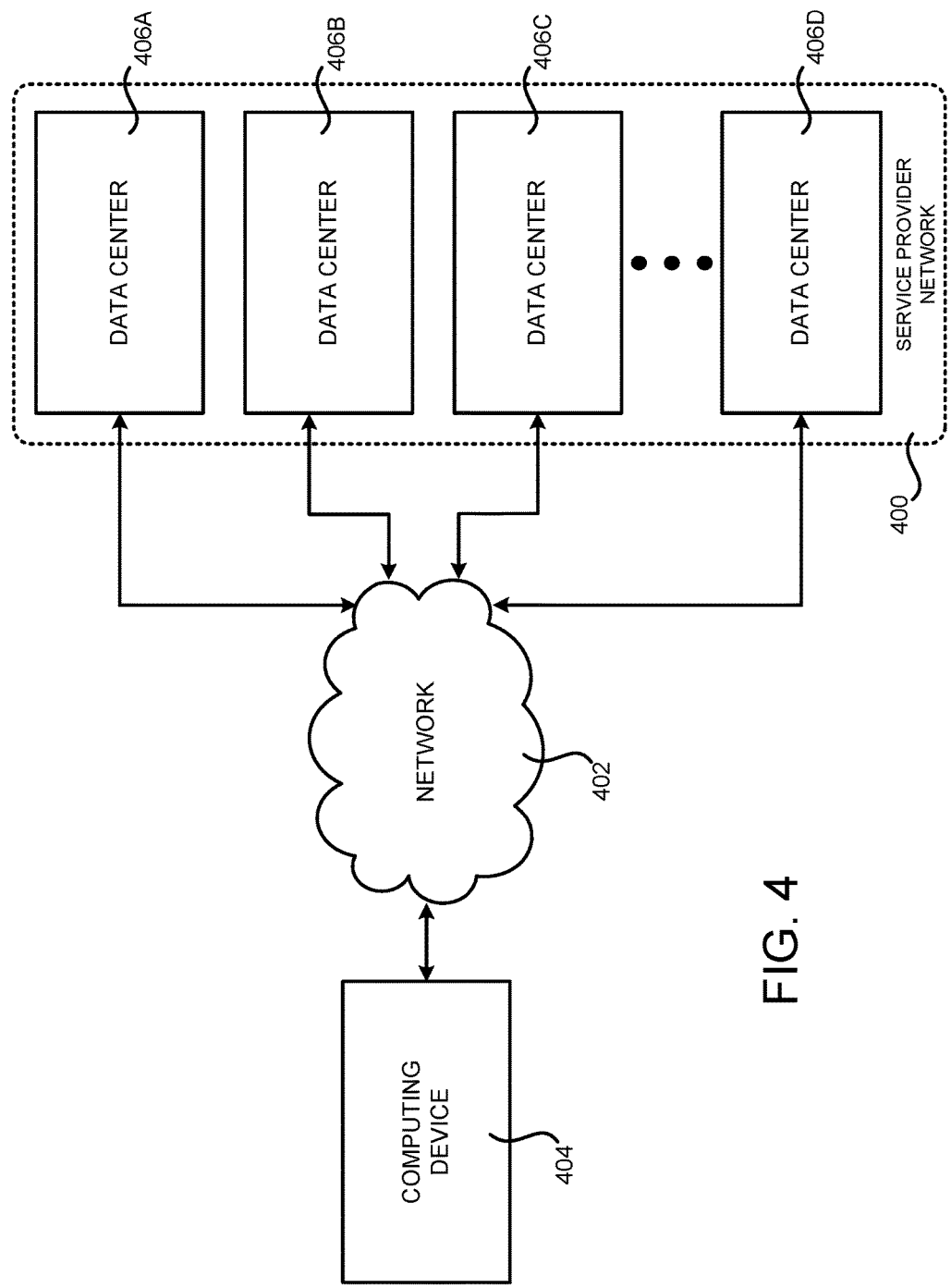
FIG. 4 is a system and network diagram that illustrates an illustrative operating environment that includes a service provider network that can be configured to implement aspects of the functionality described herein.

FIG. 4 is a system and network diagram that shows one illustrative operating environment for the configurations disclosed herein that includes a service provider network 400 that may implement all or part of message processing system 100. The service provider network 400 can execute network services that provide computing resources on a permanent or an as-needed basis. Among other types of functionality, the computing resources provided by the service provider network 400 can be utilized to implement the various services described herein. As also discussed above, the computing resources provided by the service provider network 400 can include various types of computing resources, such as data processing resources like VM instances, stateless event-driven compute services, data storage resources, networking resources, data communication resources, network services, and the like.

For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 400 are enabled in one implementation by one or more data centers 406A-406D (which might be referred herein singularly as "a data center 404" or in the plural as "the data centers 406"). The data centers 406 are facilities utilized to house and operate computer systems and associated components. The data centers 406 typically include redundant and backup power, communications, cooling, and security systems. The data centers 406 can also be located in geographically disparate locations. One illustrative configuration for a data center 406 that can be utilized to implement the technologies disclosed herein will be described below with regard to FIG. 5.

The customers and other users of the service provider network 400 can access the computing resources provided by the service provider network 400 over a network 402, which can be a wide area communication network ("WAN"), such as the Internet, an intranet or an Internet service provider ("ISP") network or a combination of such networks. For example, and without limitation, a computing device 404 (e.g., computing device 110 and another computing device 120) operated by a customer or other user of the service provider network 400 can be utilized to access the service provider network 400 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
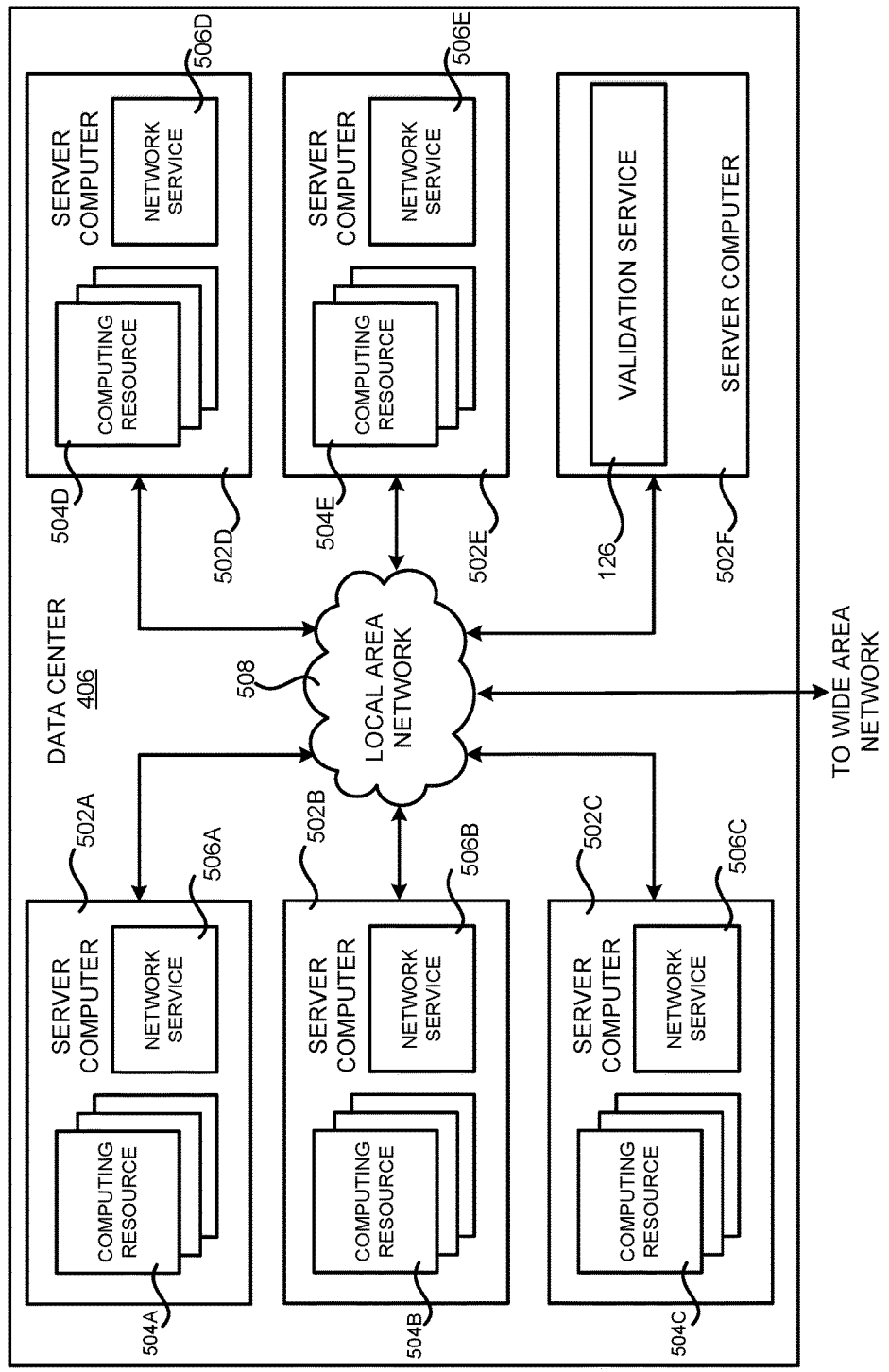
FIG. 5 is a computing system diagram illustrating a configuration for a data center that can be utilized to implement aspects of the technologies disclosed herein.

FIG. 5 is a computing system diagram that illustrates one configuration for a data center 406 that implements aspects of the technologies disclosed herein. The example data center 406 shown in FIG. 5 includes several server computers 502A-502F (which might be referred to herein singularly as "a server computer 502" or in the plural as "the server computers 502") for providing the computing resources 504A-504E.

The server computers 502 can be standard tower, rack-mount, or blade server computers configured appropriately for providing the computing resources 504 described herein (illustrated in FIG. 5 as the computing resources 504A-504E). As mentioned above, the computing resources 504 provided by the service provider network 400 can be data processing resources such as VM instances or hardware computing systems, data storage resources, database resources, networking resources, and others. Some of the servers 502 can also be configured to execute network services 506A-506E, respectively, capable of instantiating, providing and/or managing the computing resources 504.

The data center 406 shown in FIG. 5 also includes a server computer 502F that can execute some or all of the software components described above. For example, and without limitation, the server computer 502F can be configured to execute the validation service 126, which was described in detail above. The server computer 502F can also be configured to execute other components and/or to store data for providing some or all of the functionality described herein. In this regard, it should be appreciated that the validation service 126 can execute on many other physical or virtual servers in the data centers 406 in various configurations.

In the example data center 406 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 404A-404D, between each of the server computers 502A-502F in each data center 406, and, potentially, between computing resources 504 in each of the data centers 406. It should be appreciated that the configuration of the data center 406 described with reference to FIG. 5 is merely illustrative and that other implementations can be utilized.

Figure 6:
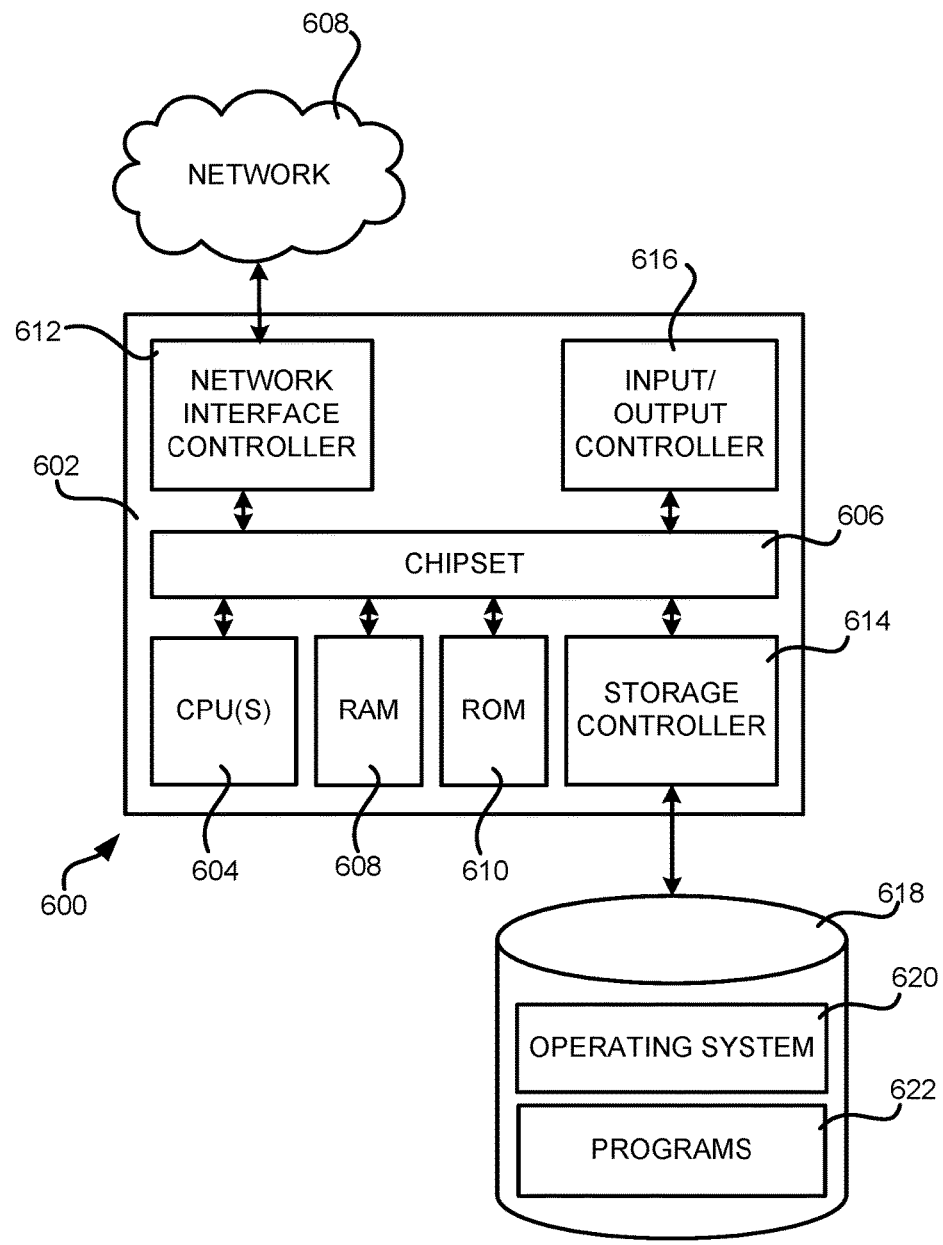
FIG. 6 is a computer architecture diagram illustrating an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 608. The chipset 606 can include functionality for providing network connectivity through a NIC 612, such as a gigabit Ethernet adapter. The NIC 612 is capable of connecting the computer 600 to other computing devices over the network 608. It should be appreciated that multiple NICs 612 can be present in the computer 600, connecting the computer to other types of networks and remote computer systems.

The computer 600 can be connected to a mass storage device 618 that provides non-volatile storage for the computer. The mass storage device 618 can store an operating system 620, programs 622, and data, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 620 utilized to control the operation of the computer 600. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 618 can store other system or application programs and data utilized by the computer 600.

In one configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various processes described above with regard to FIGS. 1-3. The computer 600 can also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or another type of output device. It will be appreciated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for handling of condition-sensitive messages and other electronic files in distributed asynchronous message workflows have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An asynchronous message processing system, comprising:
   one or more processors;
   one or more non-transitory computer-readable storage media having instructions stored thereupon, the instructions comprising:
      first instructions corresponding to a message production service which, when executed on the one or more processors, cause the system to generate an original message, wherein the original message includes at least one attribute related to a time of arrival of the original message at a message publishing service;
      second instructions corresponding to a validation service which, when executed on the one or more processors, cause the system to (i) initially validate a current time with respect to the original message, (ii) generate one or more alternatives for the original message, wherein the alternatives for the original message are based upon a plurality of potential times of arrival at the message publishing service, and (iii) forward the original message and the alternatives for the original message along a workflow to the message publishing service; and
      third instructions corresponding to a gatekeeper service which, when executed on the one or more processors, cause the system to, based upon a time of arrival, select one of (i) the original message or (ii) one of the alternatives for the original message, and to forward the selected one of the original message or the selected alternative for the original message to the message publishing service; and
   the message publishing service configured to publish the selected one of the original message or the selected alternative for the original message to an entity.

2. The asynchronous message processing system of claim 1, wherein:
   the validation service is further configured to encrypt the original message and the alternatives for the original message; and
   the gatekeeper service is further configured to decrypt the original message and the alternatives for the original message.

3. The asynchronous message processing system of claim 1, wherein the alternatives comprise clone messages comprising varying content that is dependent upon a potential time of arrival of the message.

4. The asynchronous message processing system of claim 1, wherein the alternatives comprise one or more key passes coupled to the original message, wherein the key passes comprise varying content dependent upon a potential time of arrival for modifying the original message.

5. A system, comprising:
   one or more processors;
   one or more non-transitory computer-readable storage media having instructions stored thereupon, the instructions comprising:
      first instructions corresponding to an electronic file production service, which, when executed on the one or more processors, cause the system to generate an original electronic file, wherein the original electronic file includes at least one attribute related to a condition with respect to the original electronic file;
      second instructions corresponding to a validation service which, when executed on the one or more processors, cause the system to (i) initially validate the condition of the original electronic file, (ii) generate at least one alternative for the electronic file, wherein the at least one alternative for the original electronic file is based upon the condition, and (iii) forward the original electronic file and the at least alternative for the original electronic file along a workflow to an electronic file publishing service; and
      third instructions corresponding to a gatekeeper service which, when executed on the one or more processors, cause the system configured to, based upon the condition, select one of (i) the original electronic file or (ii) one of the at least one alternative for the original electronic file, wherein the gatekeeper service is further configured to forward the selected one of the original electronic file or the selected at least one alternative for the original electronic file to the electronic file publishing service; and
   the electronic file publishing service configured to publish the selected one of the original electronic file or the selected at least one alternative for the original electronic file to an entity.

6. The system of claim 5, wherein the electronic file comprises a data packet.

7. The system of claim 5, wherein:
   the validation service is further configured to encrypt the original electronic file and the at least one alternative; and
   the gatekeeper service is further configured to decrypt the original electronic file and the at least one alternative.

8. The system of claim 5, wherein the electronic file comprises a message.

9. The system of claim 8, wherein the message comprises an email and the entity comprises a computing device associated with a recipient of the email.

10. The system of claim 5, wherein the at least one alternative comprises at least one clone electronic file comprising varying content dependent upon the condition.

11. The system of claim 5, wherein the at least one alternative comprises at least one key pass coupled to the original electronic file, and wherein the at least one key pass comprises varied content dependent upon the condition.

12. The system of claim 5, wherein the entity comprises one of a data store or an Internet of Things (TOT) device.

13. The system of claim 5, wherein the at least one attribute comprises one of time of arrival, state of the entity, a purchase order at a stock exchange, a purchase order at a commodity exchange, a price, or weather conditions.

14. A computer-implemented method, comprising:
generating an original electronic file, wherein the original electronic file includes at least one attribute related to a condition with respect to the original electronic file;
initially validating, by a validation service, a current validity of the condition;
generating at least one alternative for the electronic file, wherein the at least one alternative for the original electronic file is based upon the condition;
forwarding the original electronic file and the at least one alternative for the original electronic file along a workflow to an electronic file publishing service;
based upon the at least one condition, selecting, by a gatekeeper service, one of (i) the original electronic file or (ii) one of the at least one alternative for the original electronic file;
providing the selected one of the original electronic file or the selected at least one alternative for the original electronic file to the electronic file publishing service; and
publishing the selected one of the original electronic file or the selected at least one alternative for the original electronic file to an entity.

15. The computer-implemented method of claim 14, wherein the electronic file comprises a data packet.

16. The computer-implemented method of claim 14, wherein the electronic file comprises a message.

17. The computer-implemented method of claim 14, wherein the electronic file comprises an email and the entity comprises a computing device.

18. The computer-implemented method of claim 14, wherein the at least one alternative comprises at least one clone electronic file comprising varied content dependent upon the condition.

19. The computer-implemented method of claim 14, wherein the at least one alternative comprises at least one key pass coupled to the original message, wherein the at least one key pass comprises varied content dependent upon the condition.

20. The computer-implemented method of claim 14, wherein the at least one attribute comprises one of time of arrival, state of the entity, a purchase order at a stock exchange, a purchase order at a commodity exchange, a price, or weather conditions.

* * * * *